(12) United States Patent
Green et al.

(10) Patent No.: US 6,848,708 B2
(45) Date of Patent: Feb. 1, 2005

(54) INFLATABLE CURTAIN MODULE FOR USE IN A VEHICLE

(75) Inventors: David J. Green, Brigham City, UT (US); Paul Dinsdale, Farr West, UT (US); Karl K. Rink, Princeton, ID (US); Anthony M. Young, Malad, ID (US); Kurt L. Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/100,855

(22) Filed: Mar. 19, 2002

(65) Prior Publication Data

US 2003/0178820 A1 Sep. 25, 2003

(51) Int. Cl.[7] .......................... B60R 21/24; B60R 21/26
(52) U.S. Cl. .................... 280/729; 280/730.2; 280/737; 280/743.2
(58) Field of Search .............................. 280/729, 730.2, 280/749, 728.2, 730.1, 743.2, 737, 736, 741

(56) References Cited

U.S. PATENT DOCUMENTS

| | | | |
|---|---|---|---|
| 3,877,882 A | 4/1975 | Lette et al. | |
| 3,961,806 A | 6/1976 | Katter | |
| 4,796,912 A | 1/1989 | Lauritzen et al. | |
| 4,919,897 A | 4/1990 | Bender et al. | |
| 5,058,921 A | 10/1991 | Cuevas | |
| 5,225,940 A | 7/1993 | Ishii et al. | 359/823 |
| 5,273,309 A * | 12/1993 | Lau et al. | 280/730.2 |
| 5,301,979 A | 4/1994 | Allard | |
| 5,593,180 A | 1/1997 | Cuevas et al. | 280/741 |
| 5,630,619 A | 5/1997 | Buchanan et al. | 280/741 |
| 5,660,412 A | 8/1997 | Renfroe et al. | |
| 5,709,406 A | 1/1998 | Buchanan | 280/737 |
| 5,762,369 A | 6/1998 | Mooney et al. | 280/741 |
| 5,779,269 A | 7/1998 | Moore et al. | |
| 5,794,973 A | 8/1998 | O'Louglin et al. | |
| 5,820,161 A | 10/1998 | Svensson | 280/737 |
| 5,863,066 A | 1/1999 | Blumenthal | |
| 5,951,043 A | 9/1999 | Mooney et al. | 280/741 |
| 5,992,881 A | 11/1999 | Faigle | |
| 6,010,152 A | 1/2000 | Swann et al. | |
| 6,056,319 A | 5/2000 | Ruckdeschel et al. | |
| 6,062,599 A | 5/2000 | Forbes et al. | |
| 6,073,961 A * | 6/2000 | Bailey et al. | 280/729 |
| 6,086,094 A | 7/2000 | Stevens et al. | |
| 6,095,561 A | 8/2000 | Siddiqui et al. | |
| 6,206,412 B1 | 3/2001 | Swann et al. | |
| 6,254,124 B1 | 7/2001 | Angermaier | |

(List continued on next page.)

FOREIGN PATENT DOCUMENTS

| | | | |
|---|---|---|---|
| DE | 197 01 663 | 7/1998 | ........... B60R/21/26 |
| DE | 199 30 239 | 1/2001 | |
| DE | 100 40 822 | 4/2001 | |
| DE | 101 38 245 | 5/2002 | |
| EP | 0 949 126 | 10/1999 | |
| JP | 2000/296751 | 10/2000 | ........... B60R/21/22 |
| WO | WO99/32334 | 7/1999 | ........... B60R/21/26 |

Primary Examiner—Peter C English
(74) Attorney, Agent, or Firm—Sally J. Brown (57) ABSTRACT

An inflatable curtain module is disclosed, where the inflatable curtain module has an inflator, and an inflatable curtain. The inflator may have a biaxial flow providing a gas input into two separate inflatable cushions. The cushions may be different sizes or volumes. Alternatively, other inflatable curtain modules may incorporate multiple inflators and multiple cushions to create an inflatable curtain module. The multiple inflators can be employed to provide two gas inputs into a single inflatable cushion. An inflatable curtain module may also be created from a number of generically sized cushions and inflators that are assembled into an inflatable curtain module for a wide range of vehicles.

44 Claims, 5 Drawing Sheets

U.S. PATENT DOCUMENTS

| | | | |
|---|---|---|---|
| 6,293,581 B1 * | 9/2001 | Saita et al. | 280/730.2 |
| 6,390,499 B1 * | 5/2002 | Leitner et al. | 280/736 |
| 6,390,502 B1 * | 5/2002 | Ryan et al. | 280/730.2 |
| 6,557,902 B1 | 5/2003 | Einsiedel et al. | |
| 6,572,141 B2 | 6/2003 | Nanbu | |
| 2001/0038199 A1 * | 11/2001 | Fischer | 280/729 |
| 2001/0048218 A1 * | 12/2001 | Whang et al. | 280/737 |
| 2003/0042719 A1 | 3/2003 | Rink et al. | |

* cited by examiner

INFLATABLE CURTAIN MODULE FOR USE IN A VEHICLE

BACKGROUND OF THE INVENTION

1. Field of the Invention

The present invention relates to an apparatus and system for protecting vehicle occupants from injury. More specifically, the present invention relates to an inflatable curtain module implementing a dual flow inflator.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield. Side impact airbags, known as inflatable curtains, have also been developed in response to the need for protection from impacts in a lateral direction, or against the side of the vehicle. An inflatable curtain may have one or more separately inflated cushions.

Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion. If multiple cushions are fed by a single inflator positioned either fore or aft of the cushions, an especially long gas flow path exists between the inflator and the cushion furthest from the inflator. Thus, the outermost extents of the inflatable curtain may receive insufficient inflation gas pressure to inflate to the optimal protective pressure.

Even with somewhat shorter cushions, rapid and even inflation can be difficult to achieve with known inflator designs. Many existing inflators eject inflation gases outward radially; consequently, the inflation gases are not propelled along the length of the cushion, but are directed into the cushion near the inflator. The outer regions of the cushion are still inflated later than those closest to the inflator.

Additionally, some inflatable curtains are somewhat expensive due to the need for multiple inflators, attachment mechanisms, and the like. Many inflatable curtains require the use of a "gas guide," or conduit that conveys gas from the inflator to the inflatable curtain. Some known inflators require the use of multiple initiators that add to the manufacturing expense and manufacturing time of the inflator.

Furthermore, many inflators produce thrust upon activation. As a result, somewhat complex attachment mechanisms must often be used to affix the inflators to the vehicle to ensure that the inflators do not dislodge themselves during deployment. Such additional parts increase the cost of the inflatable curtain as well as the time and expense required to install the inflatable curtain in a vehicle.

Another shortcoming of current inflatable curtain modules is the problem of requiring an inflator for each inflatable curtain. Often each inflatable curtain employed in an inflatable curtain module, requires its own inflator. This can become cost prohibitive because of the cost of inflators and the assembly costs.

A further problem with current inflatable curtain modules is the requirement for an inflatable curtain module to be designed specifically for an individual automobile. The inflatable curtain must be sized and manufactured for a specific vehicle design. Each new vehicle introduced or each vehicle employing an inflatable curtain requires a newly designed inflatable curtain. These constraints can cause undue costs and design time in employing an inflatable curtain in a vehicle.

Accordingly, a need exists for an inflatable curtain module capable of employing a dual flow, biaxial inflator. A need further exists for an inflatable curtain module having at least two differently sized inflatable cushions. A need also exists for an inflator capable of being interchangeable with inflatable curtains of different sizes. There is also a need for an inflatable curtain module capable of employing two inflators to provide a uniform gas input to a generally large cushion.

A need also exists for an inflator capable of being implemented within an inflatable curtain module for inflating two separate inflatable curtains. There is a further need for a configuration of inflators to inflate a substantially long inflatable curtain. A need is further present for a system employing multiple generic sizes of inflatable cushions and inflators to create a wider range of inflatable curtain modules.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an inflator and related systems and methods that provides rapid, even inflation with a minimum of manufacturing and installation cost.

To achieve the foregoing objective, and in accordance with the invention as embodied and broadly described herein in the preferred embodiment, an inflatable curtain module employing a dual flow inflator is provided. According to one configuration, the inflator may comprise a gas chamber with a first end disposed within a first inlet port of the inflatable curtain and a second end disposed within a second inlet port of the inflatable curtain. The gas chamber may comprise one unitary body. The first and second inlet ports may be tightly affixed to the gas chamber such that gas is unable to escape from the inflatable curtain between the inlet ports and the gas chamber.

According to one configuration, the inflator may comprise a gas chamber having a first orifice and a second orifice. The inflator has both an open state and a sealed state. In the open state the first orifice is configured to emit a first gas flow and the second orifice is configured to emit a second gas flow. The first orifice and the second orifice are positioned such that in the open state the first gas flow exits the inflator in a direction substantially opposite to the second gas flow.

The inflator is directly attached to an inflatable curtain without the need for a gas guide or coupling member. The inflatable curtain may have several configurations. In one configuration, the inflatable curtain is a single protection zone with both the first gas flow and second gas flow ejecting gas into a single cushion. In another configuration, the inflatable curtain is divided into two protection zones. The first gas flow may emit into the first protection zone and the second gas flow may emit into the second protection zone. The two protection zones may or may not be in fluid communication.

The inflatable curtain module may also include two biaxial inflators fluidly coupled to a number of inflatable curtains. One end from each of the inflators may be attached to an inflatable curtain. Alternatively, multiple ends of different inflators may be attached to a single inflatable curtain.

Other variations of the inflatable curtain module may include a number of inflatable cushions coupled to a biaxial inflator and a unidirectional inflator. The biaxial inflator may be fluidly coupled to multiple cushions, where the cushions may have different sizes. The unidirectional inflator may be employed to provide an additional flow of gas into a generally large sized cushion that is coupled to one end of the biaxial inflator.

Additionally, the present invention may include an inflatable curtain module system for producing inflatable curtain modules from a number of generic parts for varying types of vehicles. A selective number of inflatable cushions, having varying sizes, as well as a selective number of inflators, having varying flow characteristics, may be provided. From the generically sized inflatable cushions and the inflators, an inflator module may be created for multiple vehicles by combining and interchanging the various components.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides an apparatus and system whereby problems associated with previously known inflatable curtain modules can be resolved. More specifically, through the use of a biaxial inflator and other inflator configurations, an inflatable curtain module is provided to provide an easily variable occupant restraining system. Furthermore, the inflatable curtain module provides a system to protect a large area, while being capable of being stored in a generally small storage space. The inflatable curtain module also provides a system for providing an inflatable curtain having multiple protection zones that may be independently tailored for individual vehicles.

Figure 1:
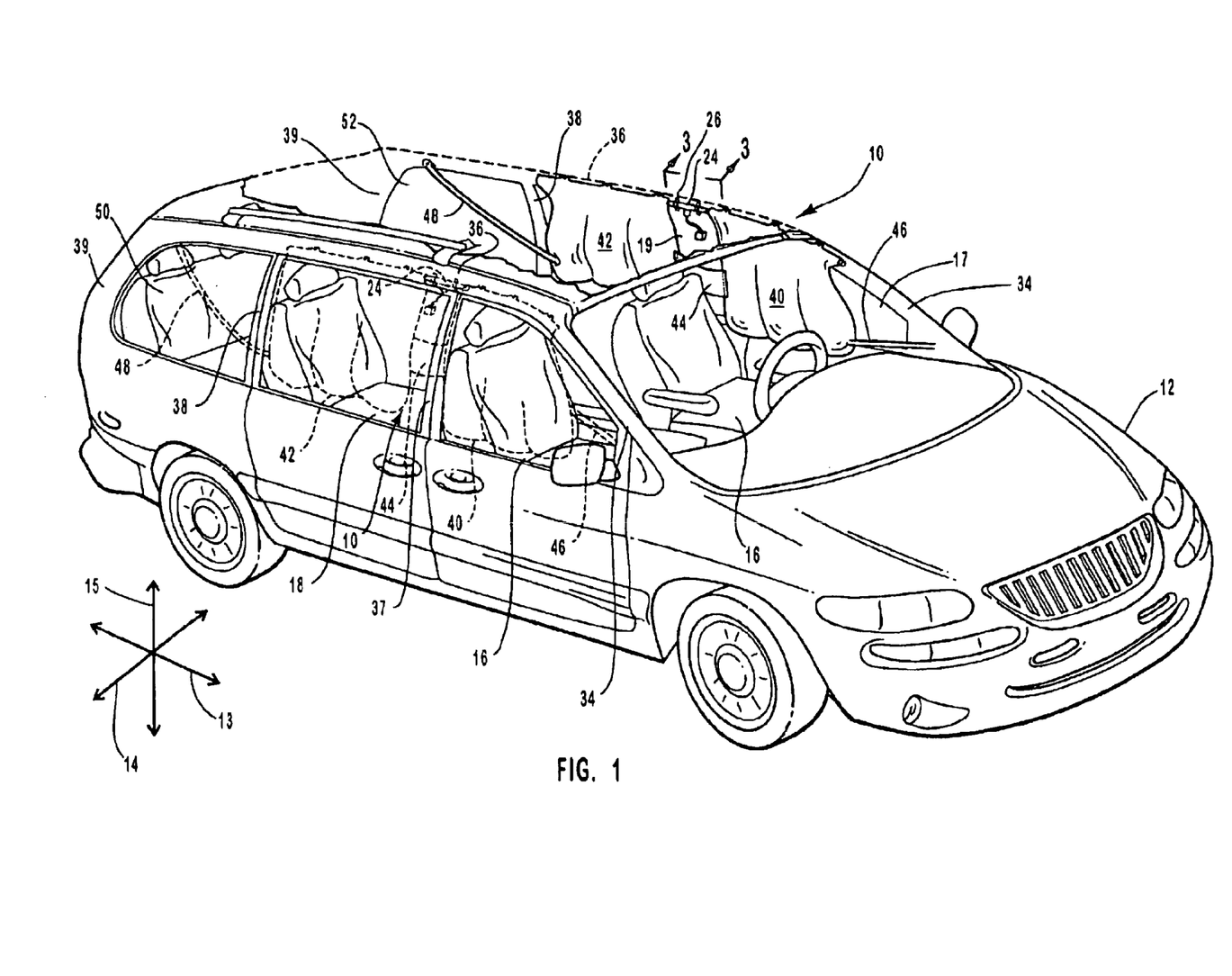
FIG. 1 is a perspective view of a vehicle with an inflatable curtain module.

Referring now to FIG. 1, an inflatable curtain 10 according to one possible embodiment of the invention is shown installed in a vehicle 12. The inflatable curtain 10 may form part of an airbag system configured to protect one or more vehicle occupants. The inflatable curtain 10 may protect the occupants against various impact scenarios through the formation of a protective curtain between the occupants and portions of the vehicle.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. Furthermore, the vehicle 12 also has back seats 50 laterally displaced from third lateral surfaces 52. As shown, two inflatable curtains 10 may be used: one for the driver's side of the vehicle 12, and the other for the passenger's side.

The inflatable curtains 10 shown in FIG. 1 are configured to protect not only occupants of the front seats 16, but those of the rear seats 18 and the back seats 50 as well. Thus, the inflatable curtains 10 may have a first protection zone 40 configured to inflate between the front seats 16 and one of the front doors 17, and a second protection zone 42 configured to inflate between the rear seats 18 and one of the rear doors 19.

Although each inflatable curtain 10 in FIG. 1 has two protection zones 40, 42, the invention encompasses the use of inflatable curtains 10 with any number of protection zones. Thus, if desired, each of the inflatable curtains 10 may be extended to have one or more protection zones positioned to protect occupants of the back seats 50 behind the rear seats 18 from impact against third lateral surfaces 52 of the vehicle 12.

The inflatable curtains 10 may be fastened to the vehicle 12 at a position near the roof rails 36. The inflatable curtain 10 may be fixed at one end to the roof rails 36, allowing the other end to hang down into portions of the vehicle 12. An inflator 24 may be associated with each of the inflatable curtains 10. The inflators 24 may be positioned approximately midway along the longitudinal 13 length of the inflatable curtains 10 to provide relatively rapid and even inflation, in a manner that will be described in greater detail subsequently. Of course, the position and attachment of the inflators 24 may be varied in a number of ways from the configuration depicted in FIG. 1.

Generally, both the inflators 24 and the inflatable curtains 10 may be attached to roof rails 36 of the vehicle 12. However, depending on the model of the vehicle 12 and the desired configuration of the inflatable curtains 10, inflatable curtain module components may also be disposed along the B pillars 37, C pillars 38, and/or D pillars 39.

Figure 2:
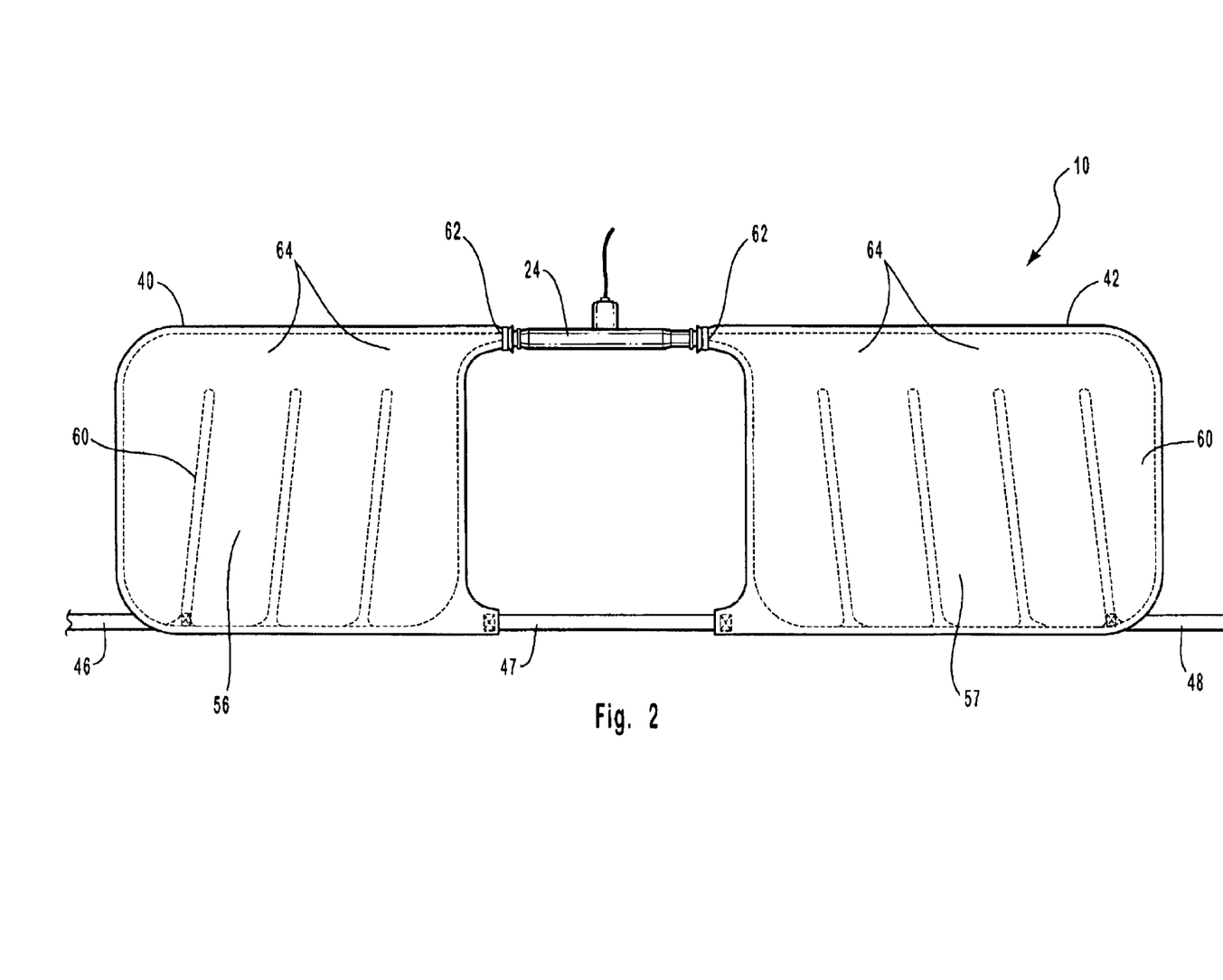
FIG. 2 is a side elevation view of an inflatable curtain module.

Referring now to FIG. 2, a side view of the inflatable curtain 10 is illustrated. The inflatable curtain 10 has a first protection zone 40 and a second protection zone 42. The protection zones 40, 42 are sized according to their various positions within a vehicle 12. For example, the inflatable curtain 10 illustrated has a first protection zone 40 that is sized to protect a vehicular passenger in the front seat 16. Therefore, the first protection zone 40 must be sized to prevent the occupant from striking the vehicle between the A pillar 34 and the B pillar 37. Similarly, the second protection zone 42 must be sized to protect the passenger from the location between the B pillar 37 and the C pillar 38.

The first protection zone 40 and the second protection zone 42 may or may not be part of a single inflatable curtain 10. For an inflatable curtain 10 where the first protection zone 40 and the second protection zone 42 are part of the same inflatable curtain 10, the protection zones 40, 42 may be a single fluidly coupled volume. For a single volume, inflatable curtain 10 may inflate to be a single cushion 56, 57 spanning from the A pillar 34 to the C pillar 38.

Alternatively, the first protection zone 40 and the second protection zone 42 may be in fluid communication, yet be configured to inflate as two separate cushions 56, 57. To remain in fluid communication, a connection zone 44 (illustrated in FIG. 1) may connect the first protection zone 40 and the second protection zone 42. The connection zone 44 would allow gas to pass between the protection zones 40, 42.

In another variation, the first protection zone 40 and the second protection zone 42 may not be in fluid communication. Thus, the first protection zone 40 and the second protection zone 42 may be separate cushions 56, 57. However, the two protection zones 40, 42 may be connected by some physical member. For example, a webbing (not shown) may connect the cushion 56 of the first protection zone 40 and the cushion 57 of the second protection zone 42. The webbing may allow the two separate protection zones 40, 42 to act as one single inflatable curtain 10. However, in other applications it may be desirable for the two protection zones 40, 42 to act independently.

Another feature that may be employed to allow the two protection zones 40, 42 to function together is the use of a tether 46, 47, 48. Depending upon the application, the inflatable curtains 10 may have a front tether 46, a central tether 47, and a rear tether 48.

As illustrated in FIG. 1, the front tether 46 may be attached to the A pillar 34 and the rear tether 48 may be attached to the roof rail 36. The tethers 46, 47, 48 may be situated to exert tension on the inflatable curtains 10 to keep them in place during inflation. The front and rear tethers 46, 48 may be stored along the roof rail 36 or along any of the pillars 34, 37, 38, 39 until deployment. Those of skill in the art will recognize that the tethers 46, 47, 48 may also be attached to other parts of the vehicle 12, such as the B pillars 37, C pillars 38, and/or D pillars 39. The tethers 46, 47, 48 may be constructed of standard seatbelt webbing or the like.

The central tether 47 may function to allow the first protection zone 40 and the second protection zone 42 to deploy uniformly. For example, certain applications may require the first protection zone 40 and the second protection zone 42 to be separate cushions 56, 57. In this application, the central tether 47 will prevent the cushions 56, 57 from moving relative to each other during deployment.

A cushion 56, 57, as used in this disclosure, refers to the inflated portion or portions of the inflatable curtain 10. Therefore, a single inflatable curtain 10 may have multiple cushions 56, 57. Furthermore, multiple protection zones 40, 42 may be present in a single cushion 56, 57, such as an inflatable curtain 10 where the two protection zones 40, 42 are a single fluidly coupled volume. Additionally, a single cushion 56, 57 may be divided into a plurality of sections 60.

The sections 60 may serve several functions within the cushions 56, 57. One function of the sections 60 would be to maintain the shape of the cushions 56, 57 once inflated. For example, the sections 60 may be divided by a number of webbings that hold a front portion and back portion of the inflatable curtain 10 at a fixed distance. As the cushion 56, 57 inflates, the webbing that defines the sections 60 will prevent the cushion 56, 57 from inflating into a round ball. Another function of the sections 60 is to control the flow of gas through the cushion 56, 57. By dividing the cushion 56, 57 into different sections 60, gas may be channeled to control inflation characteristics of the cushion 56, 57.

Additionally, the separate sections 60 may provide a damping function for the cushion 56, 57. Certain configurations of the sections 60 may provide generally small passages 64 between the different sections 60, where the small passages 64 may limit the amount of gas flow between the sections 60. As an occupant strikes a section 60 of the cushion 56, 57, only a limited amount of gas within that section 60 will be able to exit through the small passages 64. By limiting the amount of gas that may exit the individual sections 60, the section 60 will stay inflated during impact, rather than redistributing the gas to other sections 60 of the cushion 56, 57. Thus, flat spots can be avoided in the cushions 56, 57.

The cushions 56, 57 may be configured to receive a gas flow through various inlet ports 62. The inlet ports 62 are sections in the inflatable curtain 10 that couple with a source of gas, such as an inflator 24. The inlet ports 62 may have numerous variations of shapes and configurations. For example, as illustrated in FIG. 2, the inlet ports 62 may extend out of the individual protection zones 40, 42. The length of the inlet ports 62 may vary depending upon the position of the inflatable curtain 10 within the vehicle 12 as well as the position of the inflator 24. Alternatively, the inlet ports 62 may extend into the first protection zone 40 and the second protection zone 42. While the inlet ports 62 may extend into or out of the inflatable curtain 10, an inlet port 62 that extends out of the inflatable curtain 10 may be easier to attach to an inflator 24.

Furthermore, the inlet ports 62 may direct a flow of gas into two separate sections 60 of an inflatable curtain 10, such that gas from one inlet port 62 is not in fluid communication with gas from a second inlet port 62. However, gas entering the inflatable curtain 10 from each of the inlet ports 62 may be in fluid communication. Such a configuration may occur when a dual flow inflator 24 inflates a single volume of an inflatable curtain 10.

Figure 3:
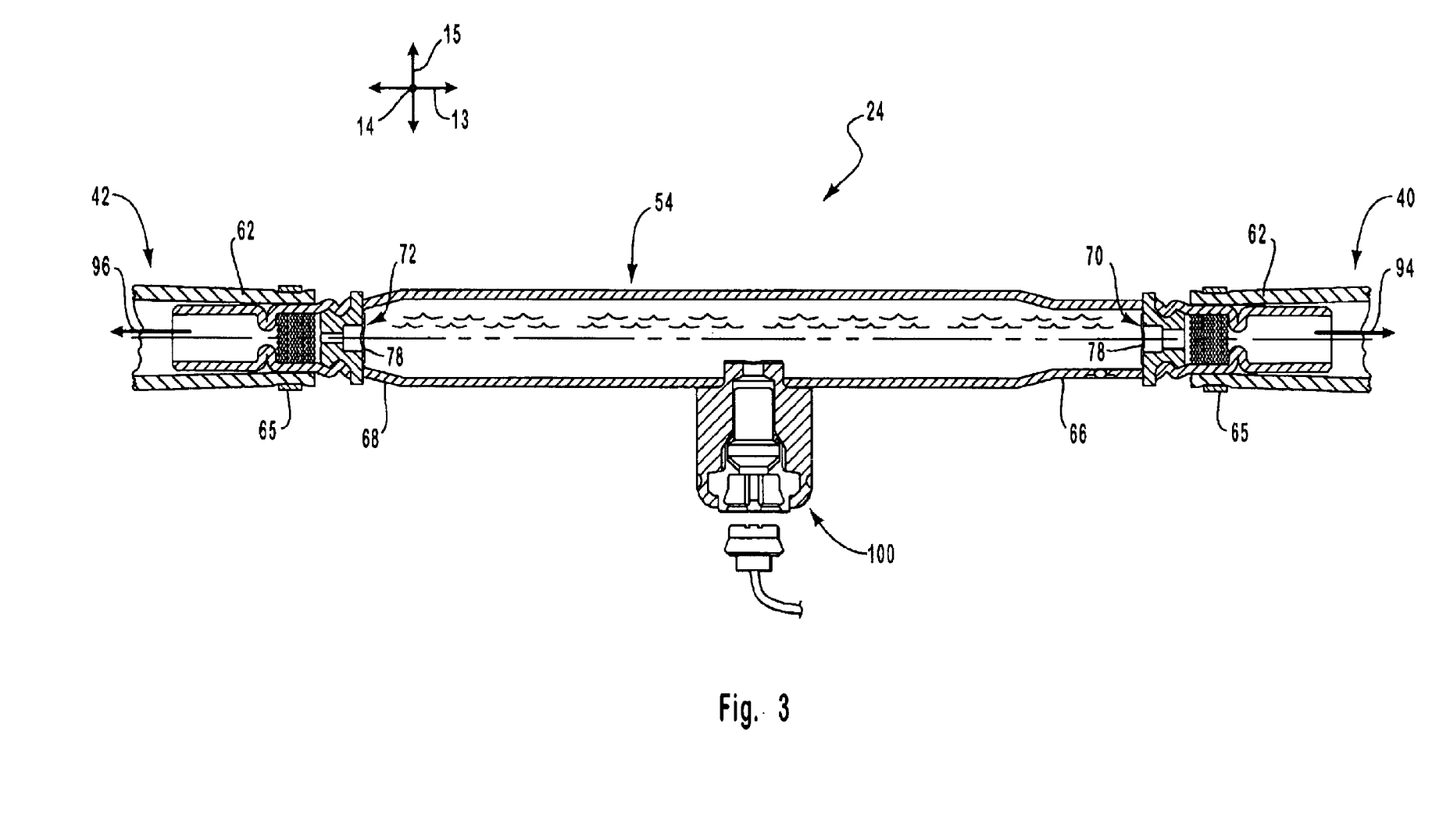
FIG. 3 is a cross-sectional view of a biaxial inflator.

Referring now to FIG. 3, a cross sectional view of a biaxial inflator 24 that may be employed with the present inflatable curtain 10, is illustrated. The inflator 24 may have a gas chamber 54 formed of a material with a comparatively high tensile strength, such as steel. The gas chamber 54 may be formed of a single, unitary piece. In the alternative, the gas chamber 54 may be made from multiple pieces that are welded or otherwise attached together to provide the configuration shown in FIG. 3. The gas chamber 54 may have a generally tubular shape that includes flat, hemispherical, or otherwise dome-like caps.

The inflator 24 may be positioned within a first inlet port 62 of the first protection zone 40 and a second inlet port 62 of the second protection zone 42 so that inflation gas leaving the gas chamber 54 directly enters the first and second protection zones 40, 42. Hence, a gas guide or other type of conduit used to channel the inflation gas from the inflator 24 to the inflatable curtain 10 is not required. The inflator 24 may simply be clamped in gas-tight fashion within the first and second inlet ports 62. For example, the clamping may be accomplished through the use of ring-shaped clamps 65 that tightly press the fabric of the inlet ports 62 against the surface of the inflator 24.

The dimensions of the gas chamber 54 may be varied to suit the volume in which the gas chamber 54 is to be installed. For example, the gas chamber 54 may be made longer than shown in the longitudinal direction 13 and/or thinner in the lateral and transverse directions 14, 15 to facilitate installation in a long, narrow space such as the space beside the roof rail 36. A longer gas chamber 54 may be installed such that the gas chamber 54 extends a significant distance into each protection zone 40, 42. Such installation may advantageously provide inflation gas flows that enter the inflatable curtain 10 about midway through each of the protection zones 40, 42 for more even inflation.

The gas chamber 54 may have a first end 66 disposed within a first inlet port 62 and a second end 68 disposed within a second inlet port 62. The first end 66 may have a first orifice 70, and the second end 68 may have a second orifice 72. Each of the first and second orifices 70, 72 has an open state, in which inflation gas can pass relatively freely through the orifices 70, 72, and a sealed state, in which substantially all inflation gasses are trapped within the gas chamber 54. Consequently, in this application, "orifice" refers to more than just a passageway; the structure (i.e., burst disks 78) that provides selective closure of the passageway is also included.

The inflator 24 may take the form of a hollow pressure vessel containing a chemically reactive material and/or compressed gas that can be activated or released, in response to a signal, to provide an outflow of inflation gases. In the embodiment of FIG. 1, the inflators 24 are partially enveloped within the inflatable curtains 10 so that inflation gases exiting the inflators 24 flow directly into the inflatable curtains 10. The inflators 24 may operate with such rapidity that, before the vehicle 12 has fully reacted to the impact, the inflatable curtains 10 have inflated to protect vehicle occupants from impact.

As shown, the first and second gas flows 94, 96 travel in the longitudinal direction 13, along the longitudinal axis of the inflator 24. The first and second orifices 70, 72 are substantially coaxial. Therefore, provided the first and second gas flows 94, 96 are equal in momentum, i.e., the gas flows 94, 96 have an equal mass flow rate and an equal exit velocity, the thrust produced by each of the gas flows 94, 96 will neutralize that of the other. Hence, the inflator 24 will be subject to substantially no thrust in the longitudinal direction 13. As a result, the inflator 24 may be attached to the vehicle 12 with only minimal support against axial motion of the inflator 24, or motion in the longitudinal direction 13.

The inflator 24 may be comparatively easily installed in the vehicle 12 to obtain the configuration depicted in FIG. 3. For example, the first end 66 of the gas chamber 54 may be inserted into a first inlet port 62, and the second end 68 may be inserted into a second inlet port 62. The inflatable curtain 10 may then be attached to the roof rail 36 in the position shown in FIG. 1, and the inflator 24 may be attached to the roof rail 36 with the connectors 26.

The steps described above may be reordered in many ways to suit the particular configuration of the vehicle 12. For example, the inflator 24 may first be attached to the roof rail 36 with the connectors 26, and the inlet ports 62 may then be fitted around the gas chamber 54. The inflatable curtain 10 may then be fixed in place.

The dual flow inflator 24 may alternatively be made in a non-thrust-neutral manner. For example, the orifices 70, 72 at the first and second ends 66, 68, or other similar structures need not be equal in size, but may be sized differently to provide varying amounts of inflation gas. Such unequal flows may be desirable, for example, if the first and second protection zones 40, 42 are sized differently, such as is illustrated in FIG. 2. In such a case, the thrust from one of the gas flows 94, 96 may only partially negate that of the other gas flow 94 or 96. Varying degrees of longitudinal support may be provided to account for such inequalities in thrust.

Many other aspects of the inflator 24 may be varied to suit the geometry of the vehicle 12, the size and shape of the inflatable curtain 10, and the available manufacturing equipment.

Figure 4:
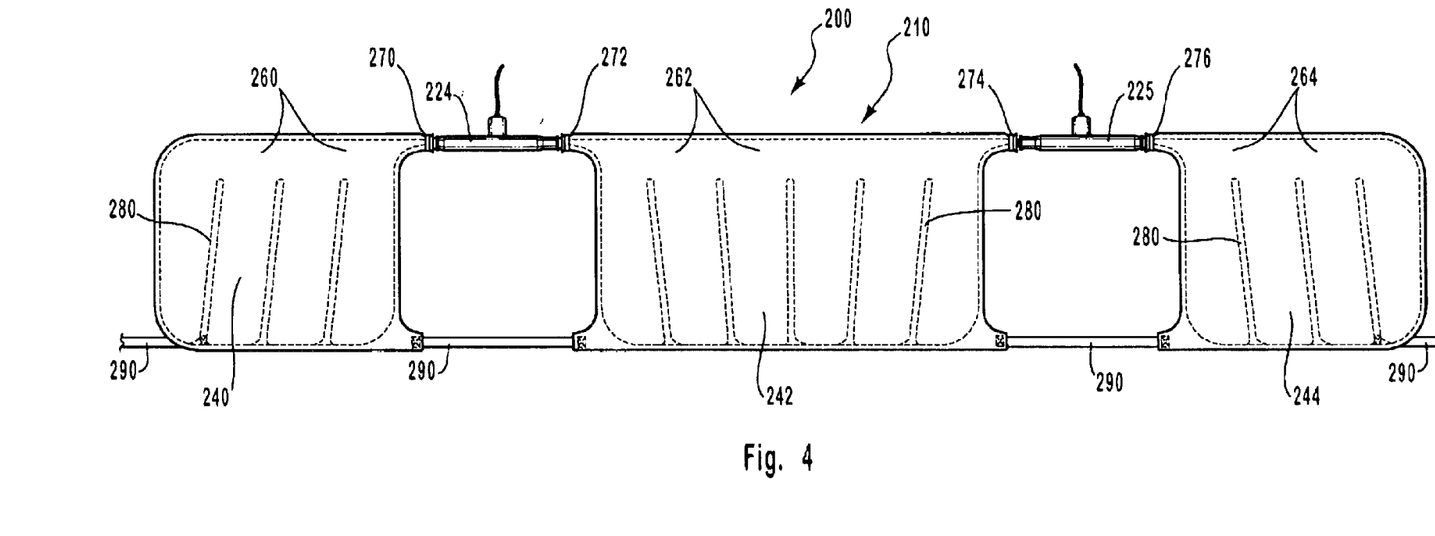
FIG. 4 is a side elevation view of another inflatable curtain module.

Referring now to FIG. 4, an inflatable curtain module 200 is illustrated. The inflatable curtain module 200 has an inflatable curtain 210 as well as a first inflator 224 and a second inflator 225. The inflatable curtain 210 has a first protection zone 240, a second protection zone 242, and a third protection zone 244. The first protection zone 240, the second protection zone 242, and the third protection zone 244, may each be separate cushions 260, 262, 264, or alternatively may be a generally large, single cushion.

The first end 270 of the first inflator 224 may be fluidly coupled to the first protection zone 240. The second end 272 of the first inflator 224 and the first end 274 of the second inflator 225 may be fluidly coupled to the second protection zone 242. The second end 276 of the second inflator 225 may be fluidly coupled to the third protection zone 244. Like the inflator 24 of FIGS. 1–3, each of the inflators 224, 225 has a longitudinal axis. The longitudinal axes of the inflators 224, 225 may be coaxial, as illustrated in FIG. 4.

As illustrated, the first protection zone 240 and the third protection zone 244 each receive a gas input from a single end 270, 276 from a single inflator 224, 225. However, the second protection zone 242 receives a gas input from a single end 272, 274 of two inflators 224, 225. Such a configuration may be employed in an inflatable curtain module 200 for protection in a vehicle 12 having a back seat 50. Thus, the first protection zone 240 may protect the back seats 50, the second protection zone 242 may protect the rear seats 18, and the third protection zone 244 may protect the front seats 16.

Because the second protection zone 242 is generally larger than the first and third protection zones 240, 244, a larger input of gas is required to inflate the second protection zone 242. Through the input of two separate gas sources, the generally long second protection zone 242 may be able to inflate at the same time as the first protection zone 240, and the third protection zone 244. This two inflator 224, 225 configuration allows for three separate cushions 260, 262, 264 of three different protection zones 240, 242, 244 to inflate simultaneously.

The three protection zones 240, 242, 244 may or may not be in fluid communication. Furthermore, the size and number of sections 280 of each of the cushions 260, 262, 264 may vary depending upon the application. For example, the first protection zone 240 and the third protection zone 244 may not be equal sizes. Additionally, the volume of the cushion 262 of the second protection zone 242 may not be equal to the sum of the cushions 260, 264 of the first protection zone 240 and the third protection zone 244. The size of each protection zone 240, 242, 244 and the number of zones will depend on the vehicle 12 and the overall module 200 configuration.

The inflatable curtain 210 may also include a tether 290 connected to portions of the protection zones 240, 242, 244. The tether 290 may be employed to anchor portions of the inflatable curtain 210 to the structure of the vehicle 12. For example, the tether 290 may anchor the inflatable curtain 210 to the A pillar 34 and to the D pillar 39. Additionally, the tether 290 may attach the separate cushions 260, 262, 264 together, such that the cushions 260, 262, 264 function as a single inflatable curtain 210 during deployment.

The inflatable curtain 210 and the inflators 224, 225 of FIG. 4 may incorporate any of the variations previously discussed in other inflatable curtain modules. These variations, among the other possibilities, may include numbers of sections, passages between sections, shapes of cushions, sizes of cushions, numbers of cushions, etc.

Figure 5:
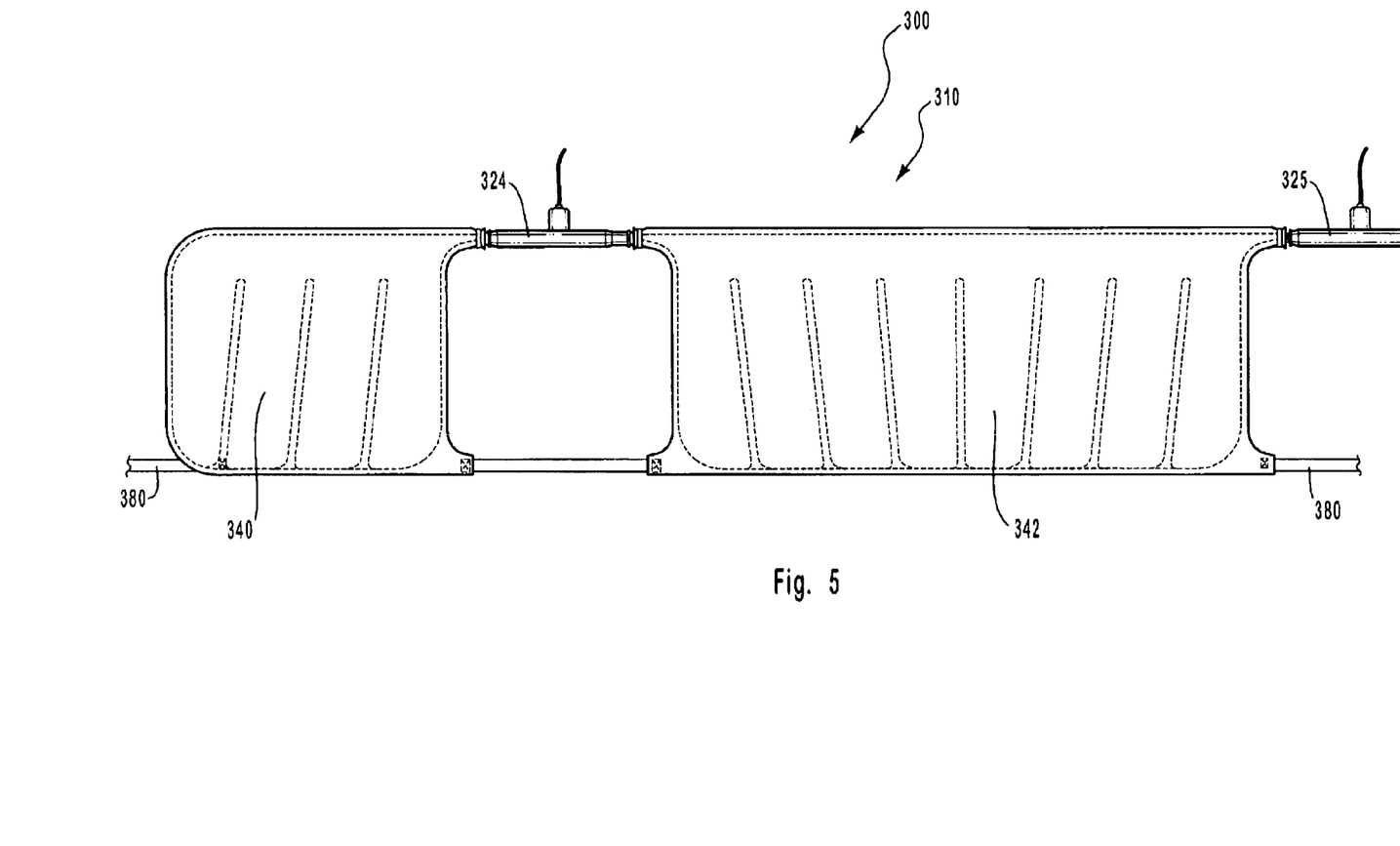
FIG. 5 is a side elevation view of a further inflatable curtain module.

Referring now to FIG. 5, an inflatable curtain module 300 employing an inflatable curtain 310, a first biaxial inflator 324, and a second unidirectional inflator 325 is illustrated. The inflatable curtain module 300 may employ many of the features associated with the previous inflatable curtain modules 200 previously illustrated. One additional feature of the inflatable curtain module 300, illustrated in FIG. 5, is the use of a unidirectional inflator 325. The inflatable curtain 310 of FIG. 5 is similar to the inflatable curtain 10 illustrated in FIG. 2.

Both inflatable curtains 10, 310 have a first protection zone 40, 340 and a second protection zone 42, 342, where the second protection zone 42, 342 is larger than the first protection zone 40, 340. In order to compensate for the larger volume of the second protection zone 342, a second unidirectional inflator 325 is present to provide a second flow of gas into the second protection zone 342. The second flow of gas into the second protection zone 342 allows the larger second protection zone 342 to inflate simultaneously with the first protection zone 340.

Alternatively, the second unidirectional inflator 325 may be employed to create different deployment characteristics within an inflatable curtain 310. Similar to other inflatable curtains 10, 210 illustrated herein, a tether 380 may be employed to assist in maintaining the position of the inflatable curtain 310 as well as controlling the deployment characteristics.

The present invention may also be encompassed in a system of interchangeable protection zones with varying numbers and types of inflators. Such a system may be comprised of a number of varying sized inflatable cushions and a number of biaxial and unidirectional inflators. A number of generically sized inflatable cushions may be provided, such that an inflatable curtain configuration may be created from the generic components to fit most types of vehicles.

By providing the generically sized inflatable cushions, a custom designed inflatable curtain need not be designed for each individual vehicle. Rather, an inflatable curtain design may be created by selecting a number of the pre-sized inflatable cushions that correspond to the size and seating configuration of the vehicle.

For example, an inflatable curtain for an SUV may be created by selecting three generically sized cushions for each of the three rows of seats. Two generally large cushions may be selected for the two rear rows of seats and a medium sized cushion may be selected for the front row of seats. If a variation of the same SUV did not have the third row of seats, one of the generally large cushions could be simply omitted. For a midsized vehicle, the same medium size cushions used in the front seat of the SUV could be used in the front row seats and the back row seats of the midsized vehicle.

Furthermore, the system could include a number of interchangeable inflators for producing different inflation types, such as the biaxial inflator and unidirectional inflators. For example, the inflatable curtain used in the SUV having three rows of seats would likely employ two biaxial inflators, similar to the inflatable curtain module illustrated in FIG. 4. However, if the third row of seats were removed, one of the biaxial inflators may be replaced with a unidirectional inflator, similar to the inflatable curtain module illustrated in FIG. 5.

Additionally, the inflatable curtain may be configured to receive a tether to maintain the position of the inflatable cushions relative to one another. The tether may be inserted through a loop or other similar hole of the varying inflatable cushions.

Thus, the inflatable curtain system can create an inflatable curtain out of stock parts for a large number of vehicles by simply interchanging the inflatable cushions and inflators depending upon the vehicle design.

Such a system would provide significant advantages over individually designing and manufacturing a single inflatable curtain for each individual vehicle. For example, the number of machines and assembly lines to manufacture an inflatable curtain can be limited to the number of machines required to make the set number of inflatable cushions and inflators. Therefore, instead of a designated manufacturing line to manufacture an inflatable curtain module for each individual vehicle, a limited number of manufacturing lines can create inflatable curtain modules for a large number of vehicles.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable curtain module for use in a vehicle comprising:
   a generally elongated inflator having a gas chamber, wherein the gas chamber has a first end, and a second end, wherein a first orifice is located in the first end and a second orifice is located in the second end, such that the gas chamber is substantially positioned between the first orifice and the second orifice, wherein gas is able to flow along a substantially straight path to reach the first orifice from the gas chamber wherein the first orifice and the second orifice are closed by respective burst disks that open to allow gas to exit the inflator from the first and second orifices; and
   an inflatable curtain, comprising at least one cushion, fluidly coupled to the inflator.

2. The inflatable curtain module, as recited in claim 1, wherein the inflatable curtain comprises a first protection zone and a second protection zone.

3. The inflatable curtain module, as recited in claim 2, wherein the first protection zone is a first cushion and the second protection zone is a second cushion.

4. The inflatable curtain module, as recited in claim 3, wherein the first cushion is fluidly coupled to the first orifice and the second cushion is fluidly coupled to the second orifice.

5. The inflatable curtain module, as recited in claim 2, wherein the first protection zone and the protection zone are the same size.

6. The inflatable curtain module, as recited in claim 2, wherein the first protection zone and the second protection zone are different sizes.

7. The inflatable curtain module, as recited in claim 2, wherein the first protection zone and the second protection zone are not in fluid communication.

8. The inflatable curtain module, as recited in claim 2, wherein the first protection zone and the second protection zone are portions of a single cushion.

9. The inflatable curtain module, as recited in claim 1, wherein the inflatable curtain has a first inlet port and a second inlet port.

10. The inflatable curtain module, as recited in claim 9, wherein the first inlet port is fluidly coupled to the first orifice and the second inlet port is fluidly coupled to the second orifice.

11. The inflatable curtain module, as recited in claim 9, wherein the inflator is directly connected to the first inlet port and the second inlet port, wherein the first and second inlet ports extend substantially parallel to a longitudinal axis of the inflator to convey gas to the inflatable curtain along the longitudinal axis.

12. The inflatable curtain module, as recited in claim 1, further comprising a tether for securing a portion of the inflatable curtain to a structural member of a vehicle.

13. The inflatable curtain module, as recited in claim 12, wherein the inflatable curtain has a fore section and an aft section corresponding to a fore section and an aft section of the vehicle.

14. The inflatable curtain module, as recited in claim 13, wherein the tether is configured to attach the fore section of the inflatable curtain to the fore section of the vehicle and wherein the tether is configured to attach the aft section of the inflatable curtain to the aft section of the vehicle.

15. An inflatable curtain module for use in a vehicle comprising:
a first inflator having a gas chamber, wherein the gas chamber has a first end, a second end, a first orifice, and a second orifice, wherein the gas chamber maintains a gas source, wherein the first orifice is located in the first end and the second orifice is located in the second end, such that the gas chamber is positioned between the first orifice and the second orifice, wherein gas is able to flow along a substantially straight path to reach the first orifice from the gas chamber, wherein the first orifice and the second orifice are closed by respective burst disks; and
an inflatable curtain comprising a first protection zone fluidly coupled to the first orifice and a second protection zone fluidly coupled to the second orifice, wherein the first and second protection zones are formed separately from each other and are attached together to provide the 16. The inflatable curtain module, as recited in claim 15, wherein the first protection zone is a first cushion and the second protection zone is a second cushion.

17. The inflatable curtain module, as recited in claim 15, wherein the first protection zone and the second protection zone are not in fluid communication.

18. The inflatable curtain module, as recited in claim 15, wherein the first protection zone and the second protection zone are attached together by a tether.

19. The inflatable curtain module, as recited in claim 15, further comprising a second inflator having a gas chamber and first orifice fluidly coupled to a third protection zone of the inflatable curtain.

20. The inflatable curtain module, as recited in claim 19, wherein the first protection zone is similarly sized to the third protection zone.

21. The inflatable curtain module, as recited in claim 19, wherein the second protection zone is a different size than the first protection zone and the third protection zone.

22. The inflatable curtain module, as recited in claim 19, wherein the first orifice and the second orifice of the first inflator are located on a first axis and the first orifice and the second orifice of the second inflator are located on a second axis.

23. The inflatable curtain module, as recited in claim 22, wherein the first axis and the second axis are coaxial.

24. The inflatable curtain module, as recited in claim 19, wherein the second inflator further comprises a second orifice fluidly coupled to the second protection zone of the inflatable curtain.

25. The inflatable curtain module, as recited in claim 15, further comprising a tether for securing a portion of the inflatable curtain to a structural member of a vehicle.

26. The inflatable curtain module, as recited in claim 25, wherein the tether is configured to attach the first protection zone to a first vehicle structural member and the tether is configured to attach the second protection zone to a second vehicle structural member.

27. An inflatable curtain module for use in a vehicle comprising:
a first inflator having a gas chamber, a first orifice, and a second orifice, wherein the gas chamber maintains a gas source;
a second inflator having a gas chamber and a first orifice, wherein the gas chamber of the second inflator maintains a gas source; and
an inflatable curtain fluidly coupled to the first orifice and the second orifice of the first inflator and fluidly coupled to the first orifice of the second inflator such that gases from the first and second inflators intermingle to inflate at least one portion of the inflatable curtain.

28. The inflatable curtain module, as recited in claim 27, wherein the inflatable curtain is comprised of a first protection zone, and a second protection zone.

29. The inflatable curtain module, as recited in claim 28, wherein the first protection zone has a first inlet port, and wherein the second protection zone has a first inlet port and a second inlet port.

30. The inflatable curtain module, as recited in claim 29, wherein the first orifice of the first inflator is located in the first inlet port of the first protection zone.

31. The inflatable curtain module, as recited in claim 30, wherein the second orifice of the first inflator is located in the first inlet port of the second protection zone.

32. The inflatable curtain module, as recited in claim 31, wherein the first orifice of the second inflator is located in the second inlet port of the second protection zone.

33. The inflatable curtain module, as recited in claim 29, wherein the first and second inlet ports of the second protection zone extend substantially parallel to a longitudinal axis of the first inflator to convey gas to the second protection zone along the longitudinal axis.

34. The inflatable curtain module, as recited in claim 28, wherein the first protection zone is a first cushion and the second protection zone is a second cushion.

35. The inflatable curtain module, as recited in claim 34, wherein the first cushion and the second cushion are different sizes.

36. The inflatable curtain module, as recited in claim 34, wherein the first cushion and the second cushion are the same size.

37. The inflatable curtain module, as recited in claim 34, wherein the first cushion and the second cushion are not in fluid communication.

38. The inflatable curtain module, as recited in claim 27, wherein the inflatable curtain is comprised of a plurality of individual cushions.

39. The inflatable curtain module, as recited in claim 27, further comprising a tether for attaching a portion of the inflatable curtain to a structural member of the vehicle.

40. The inflatable curtain module, as recited in claim 39, wherein the inflatable curtain has a fore section and an aft section corresponding to a fore section and an aft section of the vehicle.

41. The inflatable curtain module, as recited in claim 40, wherein the tether is configured to attach the fore section of the inflatable curtain to the fore section of the vehicle, and wherein the tether is configured to attach the aft section of the inflatable curtain to the aft section of the vehicle.

42. The inflatable curtain module, as recited in claim 27, wherein the first orifice and the second orifice of the first inflator are substantially coaxial.

43. The inflatable curtain module, as recited in claim 27, wherein the first inflator has a first longitudinal axis and the second inflator has a second longitudinal axis.

44. The inflatable curtain module, as recited in claim 43, wherein the first axis and the second axis are substantially coaxial.

* * * * *